United States Patent [19]

Dechow et al.

[11] 4,454,257

[45] Jun. 12, 1984

[54] ISOCYANURATE/IMIDE CROSS-LINKED RESINS AND FOAMS

[75] Inventors: Frederick J. Dechow, Midland, Mich.; William G. Stobby, Granville, Ohio

[73] Assignee: The Dow Chemical Company, Midland, Mich.

[21] Appl. No.: 482,399

[22] Filed: Apr. 6, 1983

[51] Int. Cl.$^3$ ..................... C08G 18/14; C08G 18/38
[52] U.S. Cl. ..................... 521/157; 521/137; 521/902; 525/123; 525/457; 528/73
[58] Field of Search ............... 525/457, 123; 521/157, 521/137, 902; 528/73

[56] References Cited

U.S. PATENT DOCUMENTS

| | | | |
|---|---|---|---|
| 3,314,923 | 4/1967 | Muller | 528/48 |
| 3,380,964 | 4/1968 | Grundschober et al. | 526/209 |
| 3,406,148 | 10/1968 | Sambeth et al. | 528/170 |
| 3,479,305 | 11/1969 | Kus et al. | 521/157 |
| 3,533,996 | 10/1970 | Grundschober et al. | 526/210 |
| 3,562,189 | 2/1971 | Farrissey et al. | 521/121 |
| 3,644,234 | 2/1972 | Grieve | 521/113 |
| 3,708,458 | 1/1973 | Alberino et al. | 528/67 |
| 3,720,632 | 3/1973 | Argabright et al. | 260/2.5 AW |
| 3,723,364 | 3/1973 | McLaughlin et al. | 260/2.5 AC |
| 3,772,216 | 11/1973 | Roser | 521/112 |
| 3,909,465 | 9/1975 | Wiedermann et al. | 521/157 |
| 4,108,810 | 8/1978 | Baker | 521/129 |
| 4,110,274 | 8/1978 | Corbett et al. | 521/157 |
| 4,302,572 | 11/1981 | Locatelli et al. | 528/73 |
| 4,342,860 | 8/1982 | Locatelli et al. | 528/59 |
| 4,342,861 | 8/1982 | Locatelli et al. | 528/59 |

*Primary Examiner*—H. S. Cockeram

[57] ABSTRACT

Cured resins having excellent thermal and abrasion resistance and improved processability are provided by the addition polymerization of a compound having isocyanurate moieties, imide and/or amic acid moieties and ethylenically unsaturated moieties. An example of such a compound is the reaction product of an unsaturated cyclic anhydride such as maleic anhydride, an organic polyisocyanate such as a polymeric methylene phenyl polyisocyanate and water.

17 Claims, No Drawings

ISOCYANURATE/IMIDE CROSS-LINKED RESINS AND FOAMS

BACKGROUND OF THE INVENTION

This invention relates to resins containing isocyanurate linkages and imide linkages and to methods for preparing them.

Resins containing imide or isocyanurate linkages are known to be useful in preparation of foamed resins for insulation applications as well as in the preparation of lightweight flame resistant structural foams for use in aircraft, packaging and the like. Such resins can be prepared by the reaction of polyisocyanates with dicarboxylic acids or anhydrides, e.g., see U.S. Pat. Nos. 3,314,923; 3,479,305; 3,562,189; 3,592,789; 3,644,234; 3,708,458 and 3,772,216. These linear polyimides are difficult to fabricate into useful items.

U.S. Pat. No. 3,933,700 describes the preparation of low molecular weight oligomers having viscosities as low as 400 cps at 75° F. and resulting from the reaction between excess polyisocyanate and a dianhydride at reaction temperatures of 200° C. A thermoset resin was obtained via the formation of urethane linkages by reacting the oligomer with a multi-functional, hydroxyl compound.

It is also known to prepare bisimide polymers from N,N'-bismaleimide as described in U.S. Pat. Nos. 3,380,964; 3,406,148 and 3,533,996. While it is easier to fabricate articles from the bisimide resins than from linear polyimides, the bisimide resins still do not have the processability required for many applications due to their potential to cross-link at temperatures above their melting points.

Recently as described in U.S. Pat. Nos. 4,108,810 and 4,110,274, cross-linked imide resins have been prepared by reacting an ethylenically unsaturated dicarboxylic acid and/or anhydride with a polyisocyanate. While such resins exhibit generally similar thermal resistance, they are also somewhat difficult to fabricate or otherwise process due to their increased solution or melt viscosities.

In view of the aforementioned problems with non-cross-linked as well as cross-linked imide resins, it would be desirable to provide an imide-containing resin having thermal resistance equal to or better than that of the cross-linked resins and processability equal to or better than that of the noncross-linked imide resins described in U.S. Pat. Nos. 4,108,810 and 4,110,274. It also would be desirable to provide a resin that cures readily to a highly cross-linked state having excellent processability as well as thermal resistance.

SUMMARY OF THE INVENTION

In one aspect, the present invention is an addition polymerizable compound containing the following moieties:
(1) isocyanurate,
(2) ethylenic unsaturation, and
(3) imide and/or amic acid.

In another aspect, the present invention is a curable formulation comprising an organic polyisocyanate having dispersed therein a cross-linking amount of an ethylenically unsaturated polyimide.

In a further aspect, the present invention is a cross-linked resin obtained by the addition polymerization of the aforementioned polymer.

In a final aspect, the present invention is a method for preparing such a cross-linked resin which method comprises first blending an imide-containing resin into a polyisocyanate. The resin is prepared from the reaction of an ethylenically unsaturated monoanhydride with either an equivalent amount of an aromatic polyamine or an excess of an organic polyisocyanate and a compound such as water which will convert a portion of the isocyanate to an amine under conditions sufficient to form a compound having (a) isocyanurate moieties, (b) ethylenically unsaturated moieties, and (c) amic acid and/or imide moieties. Then the blend is subjected to curing conditions, aided by energy released from the reaction of available isocyanate groups, sufficient to initiate the addition polymerization conditions to cross-link or set the resin.

Surprisingly, the addition polymerizable compound of this invention requires less energy to be added in order to cure than do ethylenically unsaturated polymers containing imide and/or amic acid moieties, but no isocyanurate moieties. Also unexpected is the fact that the isocyanate cross-linking reaction and the addition polymerization reaction do not adversely affect each other. The cross-linked resins of this invention exhibit thermal stability, flame resistance and solvent resistance comparable to or better than cross-linked resins containing amic acid and/or imide moieties, but no isocyanurate moieties as illustrated by U.S. Pat. No. 4,110,274.

The resins of the present invention are usefully employed in the manufacture of foamed articles for insulation, foamed structural components, and the like. Such resins are also useful as coatings and molded parts.

DETAILED DESCRIPTION OF ILLUSTRATIVE EMBODIMENTS

The addition polymerizable compound of this invention contains (1) sufficient imide and/or amic acid moiety to promote increased char yield of the cross-linked resin based on thermogravimetric analysis after the resin is exposed to heat, (2) sufficient isocyanurate moiety to initially gel the curable formulation and provide exothermic heat to support the addition polymerization and (3) sufficient ethylenically unsaturated moiety to enable the polymer to be cross-linked to form a dimensionally stable structure or article (cross-linked resin) as determined by the absence of any significant deformation (e.g., shrinkage) of the shape of the article upon cooling from curing temperature.

Preferred addition polymerizable compounds contain moieties represented by the following formulae:

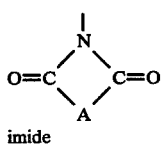

imide

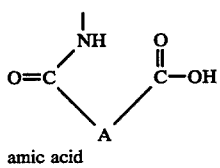

amic acid

-continued

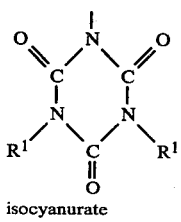
isocyanurate                                III wherein A is a divalent organic radical containing an addition polymerizable, ethylenically unsaturated group, i.e., >C=C<, and $R^1$ is a monovalent organic radical characteristically bonded to isocyanurate group in an organic polyisocyanate. While all of such moieties are present in a sample of the polymer, it is understood that each polymer molecule within the sample may not contain all of the moieties. In fact, such compound may actually be a blend of one compound containing moieties of formula I and/or II with another compound containing moieties of formula III. Preferred addition polymerizable compounds contain from about 5 to about 80, most preferably from about 10 to about 70, mole percent of the imide moiety represented by formula I; from 0 to about 80, most preferably from about 0 to about 40, mole percent of the amic acid moiety represented by formula II; and from about 20 to about 95, most preferably from about 30 to about 70, mole percent of the isocyanurate moiety represented by formula III.

The preferred addition polymerizable compounds are preferably prepared by reacting a cyclic anhydride of an ethylenically unsaturated carboxylic acid or anhydride with water and an organic polyisocyanate under conditions sufficient to promote formation of amic acid and/or imide moieties and then subjecting the reaction product to conditions conducive to the formation of isocyanurate moieties. Alternatively, the addition polymerizable compound can be prepared by blending an organic polyisocyanate with a compound containing imide and/or amic acid moieties and ethylenically unsaturated moieties. An example of such a compound is one prepared by reacting an unsaturated dicarboxylic anhydride with a polyamine represented by the formula $R^2$—$(NH_2)_y$ wherein $R^2$ is a y-valent organic moiety having from 2 to 40 carbons and y is a number from 2 to 6.

Preferred cyclic anhydrides are those represented by the general formula:

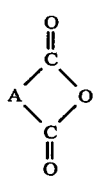
IV wherein A is a divalent organic radical containing addition polymerizable, ethylenic unsaturation, i.e., a >C=C<. The carbonyl groups of the anhydride are attached to vicinal carbon atoms in A. Preferably A is one of the radicals represented by the formulae:

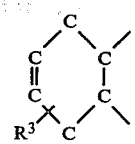
V

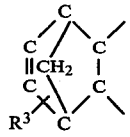
VI

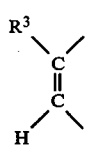

wherein $R^3$ is hydrogen or alkyl having 1 to 4 carbons such as methyl. Preferred cyclic anhydrides include, for example, maleic anhydride, tetrahydrophthalic anhydride, and bicyclo(2.2.1)hept-5-ene-2,3-dicarboxylic anhydride. Of such anhydrides, maleic anhydride is most preferred. Other anhydrides that are suitable, but less preferred than the foregoing ones, include citraconic, itaconic chloro-maleic and the like.

Preferred organic polyisocyanates for the purposes of this invention are those represented by the general formula:

$$R^4(NCO)_x \qquad \text{VII}$$

wherein $R^4$ is an x-valent organic radical having at least 4 carbon atoms and "x" valence bonds on different carbon atoms, and x is a two or more, preferably a number from 2 to about 6, most preferably, x has an average value from 2 to about 3.

In formula VII, $R^4$ includes aliphatic, acyclic or cyclic, aromatic, combinations of aliphatic and aromatic, heterocyclic and bridged radicals. When $R^4$ contains an aromatic ring, the ring is any single or multiple joined, fused or bridged ring system such as:

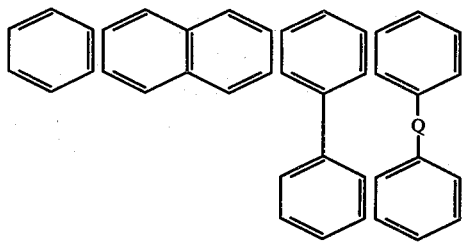

wherein the rings may be further substituted with alkyl, alkoxy, halo or like nonfunctional groups not reactive with isocyanate or carboxylic acid or anhydride groups, and Q is any bridging atom or group such as methylene or other alkylene, e.g., having up to four carbon atoms, oxygen, carbonyl, sulfur alone or in sulfoxide or sulfone, or phosphorus in phosphine oxide, phosphite or phosphate, or silicon in silane or siloxane, or tertiary amine nitrogen or the like. Specific examples (for illustration and not to exclude other examples) of such polyisocyanates of Formula VII include: the aromatic diisocyanates, such as 2,4-toluene diisocyanate, 2,6-toluene diisocyanate, crude toluene diisocyanate, methylene diphenyl diisocyanate, crude methylene diphenyl diisocyanate and the like; aromatic triisocyanates such as tris-(4-isocyantophenyl)methane; 2,4,6-toluene tris-(isocyanates); the aromatic tetra(isocyanates), such as 4,4'-dimethyldiphenylmethane-2,2',5',5'-tetra(isocyanate) and the like; alkylaryl polyisocyanate such as xylene diisocyanate; aliphatic polyisocyanates such as hexamethylene-1,6-diisocyanate, ethylene diisocyanate, dicyclohexylmethane-4,4'-diisocyanate and mixtures thereof. Other organic polyisocyanates include polymethylene polyphenyl isocyanate, hydrogenated methylene diphenyl isocyanate, m-phenylene diisocyanate, naphthalene-1,5-diisocyanate, 1-methoxyphenyl-2,4-diisocyanate, diphenylmethane-4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, isophorone diisocyanate, 1,3-bis-(isocyanatomethyl)benzene, cumene-2,4-diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4'-diisocyanatodiphenyl ether, 5,6-dimethyl-1,3-phenylene diisocyanate, 2,4-dimethyl-1,3-phenylene diisocyanate, 4,4-diisocyanatodiphenyl ether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6'-dimethyl-4,4'-diisocyanatodiphenyl and mixtures thereof. Also suited are polyisocyanates of higher functionality, particularly NCO-determined oligomers of isocyanates containing isocyanate rings, dimers of carbodiimide moieties as well as prepolymers and mixtures of the aforementioned isocyanates. Also suitable are those sometimes referred to as quasi-prepolymers of such isocyanates prepared by reacting an excess of isocyanate with an active hydrogen compound such as a polyol, preferably those made by reacting at least 2 moles of isocyanate group with one mole of active hydrogen.

In carrying out the reaction of polyisocyanate with cyclic anhydride to form a compound having amic acid moieties as represented by formula II and/or imide moieties as represented by formula I (hereinafter this compound is called an imide compound), a reaction mixture containing the polyisocyanate, water and the cyclic anhydride is prepared. Optionally a urethane catalyst as described hereinafter can be included in the reaction mixture. The starting polyisocyanates are used in proportions generally in the range from about 0.5 to about 10, preferably 1 to 3 equivalents of polyisocyanate per mole of anhydride to be reacted.

In addition to the foregoing starting materials, the reaction mixture may also contain modifying amounts of other reactants such as polymerizable or non-polymerizable carboxylic acids such as maleic acid, citraconic acid, tetrahydrophthalic acid, bicyclo(2.2.1)hept-5-ene-2,3-dicarboxylic acid and other acids, oxalic acid, malonic acid, methylmalonic acid, succinic acid, methyl succinic acid, dimethylsuccinic acid, glutaric acid, adipic acid, pimelic acid, cyclobutane-1,2-dicarboxylic acid and phthalic acid. When maleic acid or other acid is employed, the amount of water added to the reaction mixture is reduced by an amount corresponding to the water required to hydrolyze an anhydride to the corresponding acid.

The starting polyisocyanate, water and anhydride are mixed together and heated to reaction temperature, usually in the range from about 50° C. to about 150° C., preferably from about 60° C. to about 95° C. At reaction temperatures in the range from about 50° C. to 70° C., amic acid moieties represented by formula II are formed. At reaction temperatures in the range from about 100° C. to about 150° C., the amic acid moieties cyclize to form imide moieties represented by formula I. Alternatively, such conversion to imide moieties occurs by using longer reaction times at temperatures less than 100° C.

In one mode, these materials are mixed together in molten state, e.g., at a temperature of about 80° C., without added solvent. These reactants can be preheated and mixed together at the desired temperatures, or one can be preheated and mixed with the other, and the mixture heated further, if necessary. Any of the reactants can be added incrementally or in two or more portions of the reaction mixture. In the reaction mixture, it is desirable to have an excess of the anhydride material in chemical equivalents compared to the polyisocyanate equivalents in order to minimize the formation of urea linkages. In other modes, a liquid solvent such as dimethyl formamide, dioxane or methylethyl ketone is used to dissolve the reactants.

At the outset and/or during the initial stages of the reaction, water is also added to the reaction mixture usually in an amount corresponding to from about 0.1 to about 2, preferably from 0.8 to 1.2 moles per mole of anhydride. A urethane catalyst is preferably added at this time, although a catalyst is usually not necessary. By "urethane catalyst" herein is meant one which promotes reaction of isocyanates with active hydrogen compounds in accordance with known technology. If used, suitable such catalyst include alkanol amines such as are disclosed in U.S. Pat. No. 3,772,216 and various tertiary amines such as triethylamine, triethylenediamine, N,N,N',N'-tetramethyl-1,3-butanediamine, various azacyclic compounds such as the N,N-dialkylpiperazines and the like. Other suitable catalysts include alkali metal salts such as lithium ricinoleate, and heavy metal salts such as cobalt naphthenate and tin salts of carboxylic acids, e.g., stannous octoate. The amount of such catalyst, when used, depends on the activity of the catalyst. Catalysts which can also catalyze the trimerization of isocyanates are not preferred for the production of the aforementioned addition polymerizable compounds. Amine catalysts are usually used in the range from about 0.1 to about 10, preferably from about 0.2 to about 1, percent by weight of the reactants.

The mixture so formulated reacts with evolution of carbon dioxide. Carbon dioxide is allowed to escape before proceeding to the next step in this method.

In the next step of this method, the unreacted isocyanate moieties of the imide compound are reacted with each other to form the addition polymerizable polymer having isocyanurate moieties represented by formula III. Accordingly, such reaction may be accomplished by (1) utilizing the prior reaction mixture containing the imide compound and unreacted polyisocyanate or (2) suspending recovered imide compound in a liquid polyisocyanate which may or may not contain solvent. This isocyanurate reaction (trimerization) is carried out under conditions similar to conventional isocyanate reactions, e.g., as disclosed in Belgian Patent 680,380 or *Polyurethanes: Chemistry and Technology I. Chemistry*, Saunders and Frisch, Interscience (1962). Advantageously, the isocyanurate reaction is promoted by the presence of a catalytic amount of a trimerization catalyst such as amines, phosphines, metal alkoxides, metal oxides, organometallic compounds, metal chelates, metal carboxylates, other organic compounds and combinations thereof. Such catalysts are illustrated in further detail in U.S. Pat. No. 3,516,950 and Saunders et al., supra. Of the trimerization catalysts the zwitterion catalysts such as described in U.S. Pat. Nos. 4,220,728 and 4,111,914 are suitable. Alkali metal carboxylates such as potassium octoate and potassium acetate are preferred. Also suitable are mixtures of such trimerization catalysts such as a mixture of an alkali metal carboxylate and a conventional polyamine catalyst or trimerization catalyst.

Such trimerization catalysts are employed in amounts effective to promote the formation of the desired isocyanurate moieties. Such effective amounts of such trimerization catalysts are preferably in the range from about 0.05 to about 5, preferably from about 0.2 to about 1, weight percent, of the catalyst based on the weight of unreacted isocyanate.

In addition to the aforementioned trimerization catalysts, other ingredients may be employed such as surfactants, blowing agents, polyols or other active hydrogen compounds as disclosed in U.S. Pat. No. 4,220,728, and the like. Examples of such other ingredients are described in U.S. Pat. Nos. 3,516,950 and 4,111,914. Of such other ingredients, the following are preferred:

(1) as surfactants, the organopolysiloxanes;
(2) as blowing agents, volatile hydrocarbons and/or halohydrocarbons such as pentane, benzene, trichlorofluoromethane and trichlorotrifluoroethane;
(3) as active hydrogen compounds, the polyether polyols, especially polyether diols and triols having equivalent weights between 30 and 200.

It is further understood that additional materials such as pigments, stabilizers, dyes, flame retardants, fillers and the like may also be employed. Such other ingredients and additional materials are optionally employed in this method in accordance with practices common to the manufacture of isocyanurate/polyurethane materials.

In preparing the addition polymerizable polymer, the imide compound may be first mixed with additional polyisocyanate and then combined with the trimerization catalyst or may be combined as is with the trimerization catalyst. The isocyanurate reaction is initiated by heating the reaction mixture comprising the imide compound, unreacted isocyanate, trimerization catalyst and any other optional ingredients or materials as described hereinbefore to a temperature in the range from about 50° C. to about 150° C., preferably from about 70° C. to 120° C., preferably for a period from about 0.1 to about 3 hours to complete the trimerization reaction.

The addition polymerizable polymer is subjected to conditions sufficient to polymerize the ethylenically unsaturated moieties to form the desired resin which contain imide moieties and isocyanurate moieties and one or more polyethylenic chains. Such addition polymerization can be effected by merely heating a reaction mixture containing the addition polymerizable polymer to sufficient temperatures, e.g., in the range from about 125° C. to about 250° C., preferably from about 150° C. to about 225° C., for a period of 0.1 to 2 hours. Such thermally initiated polymerization can and often does occur during the trimerization reaction to form the isocyanurate moieties. Alternatively, addition polymerization is effected using a free-radical generating chemical initiator such as a peroxygen compound, e.g., di(t-butyl)peroxide, t-butyl peroxy 2-methyl benzoate, cyclic peroxy metals as well as peracids, peresters and other peroxygen compound disclosed in U.S. Pat. No. 3,380,964. Also suitable are any compounds such as azobisisobutyronitrile and others disclosed in U.S. Pat. No. 3,380,964. In such chemically initiated polymerization, the polymerization mixture is advantageously heated to a temperature in the range from about 50° C. to about 225° C., preferably from about 70° C. to about 150° C. for a period from 0.1 to 2 hours.

Prior to or during the final curing step wherein the addition polymerizable polymer is converted to a crosslinked resin, the curable mixture may be applied as a coating to a wide variety of substrates, cast into a mold and cured to form a solid article or foamed and cured to produce a cellular article. Of particular interest in the practice of this invention is the formation of foamed articles. In general such articles are produced by using the addition polymerizable polymer of this evolution in a formulation similar to those used for making polyurethane foam such as disclosed in U.S. Pat. No. 2,577,281 and *Polyurethanes: Chemistry and Technology II. Technology,* Saunders and Frisch, Interscience, (1964), or polyimide foams as disclosed in U.S. Pat. No. 4,110,274 which is incorporated herein in its entirety.

Illustratively, a formulation containing from about 70 to about 95 weight percent of the addition polymerizable polymer, from about 0.1 to about 5 weight percent of a polyalkylsiloxane-polyoxyalkylene copolymer as a surfactant, from 0 to about 1 weight percent of benzoyl peroxide as a free radical generating initiator, from 0 to about 20 weight percent of trichlorofluoromethane as a blowing agent is charged to a mold and heated to a temperature from about 50° C. to about 150° C. for a period from about 0.1 to about 2 hours. The resulting foam has properties similar to those of the foams described in the following examples.

The following examples are given to illustrate the invention, but should not be construed as limiting its scope. Unless otherwise indicated, all parts and percentages described herein are by weight.

EXAMPLE 1

A 74.4 part portion of a polymeric methylene phenyl polyisocyanate having an equivalent weight of 131 (e.g., Mondur MR sold by Mobay Chemical Co.) (hereinafter called PMPI) is mixed with 37.1 parts of molten maleic anhydride, 6.8 parts of water and 3.2 parts of N-methyl-N,N-diethanolamine. The mixture is placed in a heated bath at 50° C. for 10 minutes. The exothermic reaction is allowed to proceed, releasing carbon dioxide. Upon cooling, the solid reaction product is pulverized and unreacted maleic anhydride is removed by heating in a vacuum oven at 70° C. Infrared analysis of the resulting compound indicates that it contains amic acid, imide and isocyanate moieties (imide compound).

Several compositions (Sample Nos. 1–3) are prepared by blending the aforementioned imide compound with the PMPI in varying proportions as indicated in Table I. After homogenous solutions or well dispersed suspensions (hereinafter generically called a dispersion) are achieved, 2,4,6-tris(dimethylaminomethyl)phenol is added as a trimerization catalyst to such dispersions. The resulting dispersions are stirred for ten seconds, spread on a metal sheet and heated at 80° C. for 2 hours. The resulting cured resins are tested for thermal resistance and the results are reported in Table I.

Several additional compositions (Sample Nos. 4–7) are prepared by blending 7.5 parts of PMPI 2.5 parts of the aforementioned imide compound and 0.1 part of a free radical initiator described in Table I, and 0.67 part of 2,4,6-tris(dimethylaminomethyl)phenol. Each of the resulting dispersions is stirred for 10 seconds, spread on a metal sheet and heated at 80° C. for 2 hours. The cured resins are tested for thermal resistance and the results are shown in Table I.

For purposes of comparison, a conventional polyisocyanate composition containing no imide or amic acid functionalities (Sample No. C) is prepared from 10 parts of PMPI and 0.85 part of 2,4,6-tris(dimethylaminomethyl)phenol. The resulting mixture is stirred for 10 seconds, spread on a metal sheet and heated at 80° C. for 2 hours. The cured resin is tested for thermal resistance and the results are reported in Table I.

EXAMPLE 2 parts of PMPI. After dispersion is achieved, 2,4,6-tris(dimethylaminomethyl)phenol is added as a trimerization catalyst. The resulting dispersion is stirred for 10 seconds, spread on a metal sheet and heated at 80° C. for 2 hours. The resulting cured resin (Sample No. 8) is tested for thermal resistance and the results are reported in Table I.

As an additional illustrative embodiment, 2.5 parts of the imide compound of this example is first melt blended with 7.5 parts of PMPI and then 2.5 parts of the imide compound of Example 1 is dispersed into the blend. To this dispersion is added 2,4,6-tris(dimethylaminomethyl)phenol. The dispersion is stirred for 10 seconds, spread on a metal sheet and heated at 80° C. for 2 hours. The resulting cured resin (Sample No. 9) is tested for thermal resistance and the results are reported in Table I.

TABLE I

| Sample No. | NCO Parts[1] | Imide Compound Parts[2] | Trimer Catalyst Parts[3] | Addition Polymerization Catalyst[4] | | Decomposition Temperature °C.,[5] | | | |
|---|---|---|---|---|---|---|---|---|---|
| | | | | Type | Amount Parts | 10% | 25% | 50% | PPT[6] |
| 1 | 9.0 | 1.0 | 0.67 | None | — | 340 | 435 | 508 | >700 |
| 2 | 7.5 | 2.5 | 0.54 | None | — | 322 | 365 | 545 | >700 |
| 3 | 5.0 | 5.0 | 0.22 | None | — | 310 | 366 | 550 | >700 |
| 4 | 7.5 | 2.5 | 0.67 | BP | 0.1 | 300 | 365 | 610 | >700 |
| 5 | 7.5 | 2.5 | 0.67 | t-BPMB | 0.1 | 330 | 430 | >700 | >700 |
| 6 | 7.5 | 2.5 | 0.67 | t-BHP/dt-BP | 0.1/0.1 | 316 | 370 | 565 | >700 |
| 7 | 7.5 | 2.5 | 0.67 | CPK | 0.1 | 310 | 380 | 600 | >700 |
| C* | 10.0 | 0 | 0.85 | None | — | 375 | 490 | 605 | 605 |
| 8 | 7.5 | 2.5 | 0.54 | None | — | 320 | 456 | 547 | >700 |
| 9 | 7.5 | 5.0 | 0.54 | None | — | 315 | 470 | 573 | >700 |

Notes:
*Not an example of the invention.
[1]Weight parts of PMPI in the curable composition.
[2]Weight parts of imide compound in the curable composition.
[3]Weight parts of 2,4,6-tris(dimethylaminomethyl)phenol.
[4]Weight parts of the addition polymerization catalyst in the curable composition wherein BP represents a 60 weight percent of benzoyl peroxide in butyl benzyl phthalate, t-BPMB represents t-butyl peroxy 2-methyl benzoate, t-BHP/dt-BP represents a 70/30 (weight ratio) mixture of t-butyl hydroperoxide and di-t-butyl peroxide, respectively, and CPK represents a cyclic peroxy ketal.
[5]Decomposition temperature determined by measuring the present temperature at which 10, 25 and 50 percent of the weight of the sample of cured resin is lost.
[6]PPT indicates the temperature at which precipitous (near total) weight loss occurs.

Into a 5-liter flask, purged with nitrogen, is added a solution of 300 grams of maleic anhydride in 0.6 liter of acetone. This solution is cooled to less than 10° C. To this solution is added dropwise over a 2- to 3-hour period a solution of 295 grams of polyamine sold by the Upjohn Company under the tradename, CURITHANE 103, in 0.75 liter of dried acetone. After the addition is complete, 23.1 grams of sodium acetate and 4 grams of nickel acetate are added with stirring to the resulting mixture which is then stirred for one-half hour. Then a 345-ml portion of acetic anhydride is added with stirring at room temperature and the resulting solution is maintained at room temperature for at least 48 hours. This reaction mixture is then heated to 45° C. for 3 to 4 hours to assure complete imide formation. The resulting product is subjected to vacuum to remove acetone and acetic acid by-product thereby yielding a dark brown viscous liquid to which is added 10 liters of distilled water with stirring. The water is removed by decantation and the remaining residue is homogenized with 8 liters of water to yield a finely divided solid suspension of the imide compound in water. The imide compound is washed two more times with 8 liter portions of water and then filtered and vacuum dried at room temperature for 24 hours and then at 100° C. for four hours. The resulting dried product is ground into a fine powder and 2.5 parts of this imide compound is blended with 7.5

As evidenced by comparing Sample Nos. 1–7 with Sample No. C, Sample Nos. 1–7 containing the imide compound exhibit better resistance to heat than does Sample No. C, which contains no imide compound. Sample Nos. 8 and 9 undergo precipitous weight loss at a higher temperature than does Sample No. C.

EXAMPLE 3

Following the procedure of Example 1, an imide compound is prepared from 74.4 parts of PMPI, 37.1 parts of maleic anhydride, 6.82 parts of water and 3.2 parts of N-methyl(N,N-diethanol amine). The resulting imide compound is added with stirring to a solution of PMPI, blowing agent and surfactant in proportions as specified in Table II. Stirring is continued until the resulting mixture becomes homogenous or finely dispersed. Trimerization catalyst is then added with stirring to the solution. The resulting foam formulation (Formulation No. 1) is cast into a foam mold wherein the formulation creams and rises. After an initial period ($T_I$), the foam in the mold is heated at 80° C. for 2 hours. The foam is removed from the mold, aged for 5 days at room temperature and then tested for physical properties. The results of these tests are reported in Table III. Additional foam formulations (Formulation Nos. 2–7) are similarly prepared and tested. The proportions of ingredients are reported in Table II and the physical properties of the foams are reported in Table III.

For purposes of comparison, an isocyanurate foam (Formulation No. C) is similarly prepared except that none of the imide compound is employed. The foam is tested for physical properties and the results are similarly reported in Tables II and III.

Following the foregoing procedure, a formulation (Formulation No. 7) is similarly prepared using the imide compound of Example 2 and converted to foam and tested. The proportion of ingredients is reported in Table II and the results of testing this foam is reported in Table III.

TABLE II

| Formulation No. | NCO Parts[1] | Imide Parts[2] | Surfactant Parts[3] | Trimer Catalyst Parts[4] | Blowing Agent Parts[5] |
|---|---|---|---|---|---|
| 1 | 70 | 3.5 | 2.1 | 6.3 | 10.5 |
| 2 | 70 | 7.0 | 2.1 | 6.3 | 10.5 |
| 3 | 35 | 26.25 | 2.1 | 6.3 | 10.5 |
| 4 | 35 | 35.0 | 2.1 | 6.3 | 10.5 |
| 5 | 70 | 20.0 | 4.5 | 6.3 | 13.5 |
| 6 | 70 | 20.0 | 6.3 | 6.3 | 13.5 |
| C* | 70 | 0 | 2.1 | 6.3 | 10.5 |
| 7 | 70 | 20.0 | 2.1 | 7.0[6] | 13.5 |

*Not an example of the invention.
[1]Weight parts of PMPI in the foam formulation.
[2]Weight parts of the imide compound of Example 2 in the foam formulation.
[3]Weight parts of a polyalkylsiloxane-polyoxyalkylene copolymer sold by Dow Corning as a surfactant under the trade designation DC-193.
[4]Weight parts of 2,4,6-tris(dimethylaminomethyl)phenol.
[5]Weight parts of trichlorofluoromethane.
[6]Indicates N,N',N''—tris(dimethylaminopropyl)-sym-hexahydrotriazine sold by Abbott Laboratories under the tradename, Polycat 411.

TABLE III

| Sample No. | Formulation No. | $T_I$, minutes[1] | Density, lb/ft[3] | % Closed Cell[2] | K— factor[3] | Compressive Strength[4] lb/in[2] |
|---|---|---|---|---|---|---|
| 1 | 1 | 10 | 2.75 | 87 | NM | NM |
| 2 | 2 | 10 | 2.60 | 83 | NM | NM |
| 3 | 3 | 10 | 3.28 | 74 | NM | NM |
| 4 | 4 | 10 | 2.90 | 75 | NM | NM |
| 5 | 5 | 20 | 2.27 | 88 | 0.148 | 18.4 |
| 6 | 6 | 10 | 2.12 | 86 | 0.16 | 16.4 |
| 7 | 6 | 20 | 2.29 | 82 | 0.17 | 12.5 |
| C* | C* | 15 | 2.17 | 94 | 0.137 | 24.5 |

TABLE III-continued

| Sample No. | Formulation No. | $T_I$, minutes[1] | Density, lb/ft[3] | % Closed Cell[2] | K— factor[3] | Compressive Strength[4] lb/in[2] |
|---|---|---|---|---|---|---|
| 8 | 7 | 10 | 2.18 | 88 | 0.157 | 17.6 |

*Not an example of the invention.
NM — Not measured.
[1]$T_I$ — time in minutes before foam is placed in an oven for curing at 80° C.
[2]ASTM D-2856.
[3]ASTM C-518.
[4]ASTM D-1623.

As shown in Table III, Sample Nos. 1-8 exhibit physical properties similar to that of Sample No. C, the isocyanurate foam containing no imide compound. Although not shown, all of the foams of Table III are probably too brittle for many commercial applications. Such brittleness can be substantially overcome by employing a polyol as shown in Example 4.

EXAMPLE 4

A 42-part portion of the imide compound of Example 2 is suspended or dissolved completely in 280 parts of MONDUR MR. Blowing agent, urethane catalyst, trimerization catalyst, surfactant, and epoxy resin as specified in Table IV are added to the suspension or solution of imide compound and mixed thoroughly for 5-10 seconds. The resulting foam formulation (Sample No. 1) is cast into a foam mold wherein the formulation creams and rises. After an initial period of about 2 minutes, the foam in the mold is heated at 80° C. for 1 hour. The foam is then removed from the mold, aged for 5 days at room temperature and then tested for physical and fire retardant properties. The results of these tests are reported in Table V. Additional foam formulations (Sample Nos. 2 and 3) are similarly prepared and tested. The proportions of ingredients employed are reported in Table IV and the physical and flame retardant properties of the foams are reported in Table V.

For the purposes of comparison, two isocyanurate foams (Formulation Nos. $C_1$-$C_2$) are similarly prepared except that none of the imide compound is employed. These foams are also tested for physical properties and flame retardance and the results are similarly reported in Tables IV and V.

TABLE IV

| Sample No. | NCO Parts[1] | Imide Parts[2] | Surfactant Parts[3] | Trimer Catalyst Parts[4] | $CCl_3F$ Parts[5] | Urethane Catalyst Parts[6] | DEG Parts[7] | Epoxy Parts[8] |
|---|---|---|---|---|---|---|---|---|
| 1 | 280 | 42(a) | 3 | 3(c) | 50 | 5.7 | 37.7 | 10 |
| 2 | 280 | 42(b) | 3 | 3(c) | 50 | 5.7 | 37.7 | 10 |
| $C_1$* | 280 | — | 3 | 3(c) | 50 | 5.7 | 36.0 | 10 |
| 3 | 79 | 40 | 2 | 4.1(d) | 25 | 1.0 | 6.9 | 4.1 |
| $C_2$* | 93 | — | 1 | 1.7(d) | 18 | 1.9 | 8.3 | 3.4 |

*Not an example of the invention.
[1]Weight parts of polymethylene polyphenylene isocyanate (PMPI).
[2]Weight parts of imide compound as described in this example wherein (a) indicates that the powdered imide compound is suspended in PMPI at room temperature and (b) indicates that the imide compound is melt blended with PMPI at 125° C. for 15 minutes.
[3]Weight parts of a polyalkylsiloxane-polyoxyalkylene copolymer sold by Dow Corning as a surfactant under the trade designation DC-193.
[4]Weight parts of trimerization catalyst wherein (c) indicates a solution of potassium octoate sold by M&T Chemicals under trade designation T-45 and (d) indicates a solution of 25 weight percent of potassium acetate in diethylene glycol.
[5]Weight parts of trichlorofluoromethane (blowing agent).
[6]Weight parts of 2,4,6-tris(dimethylaminomethyl)phenol sold by Rohm and Haas under trade designation DMP-30.
[7]Weight parts of diethylene glycol (DEG).
[8]Weight parts of epoxy resin sold by The Dow Chemical Company under the trade designation DER 330.

TABLE V

| Sample No. | Density lbs/ft[3] | Compressive Strength[1] | Friability Percent Weight Loss[2] | Burn Thru Minutes[3] | Flame Spread[4] | K—Factor[5] |
|---|---|---|---|---|---|---|
| 1 | 1.7 | 15.9 | 1.0 | 11 | 70 | 0.127 |
| 2 | 2.1 | 24.2 | 8.3 | 22 | 60 | 0.124 |
| $C_1$* | 1.7 | 19.0 | 15.6 | 21 | 48 | 0.126 |
| 3 | 1.6 | 16.4 | 1.8 | 8[6] | NM | 0.122 |
| $C_2$* | 1.5 | 15.7 | 10.4 | 6[6] | NM | 0.142 |

*Not an example of the invention.
NM — Not Measured.
[1] ASTM D-1623 sum of compressive strength in three directions divided by 3.
[2] ASTM C-367.
[3] Flame penetration test of Bureau of Mines which is modified by placement of the foam sample in a vertical position instead of a horizontal position. Does not reflect actual performance in real fire situation.
[4] ASTM D-3806-79. Does not reflect actual performance in real firesituation.
[5] ASTM C-518.
[6] Burn through times are reduced by the use of the hotter flame for time efficiency.

As evidenced by the data in Table V, all the foams showed improved K factors and friability as a result of the incorporation of ethyleneoxy units and the formation of urethane. Sample Nos. 1–3 which contain imide moieties exhibit lower friability (higher resistance to abrasion) than do Sample No. $C_1$ and $C_2$, which contain no imide moieties.

What is claimed is:

1. An addition polymerizable composition containing isocyanurate moieties, ethylenically unsaturated moieties, and imide moieties, amic acid moieties, or a mixture of imide and amic acid moieties wherein (1) the isocyanurate moieties are present in an amount sufficient to initially gel a curable blend containing the composition and to provide sufficient heat to support addition polymerization of the ethylenically unsaturated moieties, (2) the ethylenically unsaturated moieties are present in an amount sufficient to enable the curable blend to form a dimensionally stable cross-linked resin upon addition polymerization of such unsaturated moieties, and (3) the imide or amic acid moieties are present in an amount sufficient to promote increased char yield of the cross-linked resin as determined by thermogravimetric analysis of the resin after it is exposed to heat.

2. A cross-linked resin formed by the addition polymerization of the composition of claim 1.

3. The cross-linked resin of claim 2 in the form of a foam.

4. A method for preparing the cross-linked resin of claim 2, which method comprises the steps of
   (1) reacting an ethylenically unsaturated monoanhydride with an excess of organic polyisocyanate and a compound which will convert the isocyanate to an amine under conditions sufficient to form a composition having isocyanurate moieties, ethylenically unsaturated moieties, and amic acid and/or imide moieties, and
   (2) subjecting the composition to addition polymerization conditions sufficient to cure the compound to a crosslinked resin.

5. The composition of claim 1 which comprises from about 5 to about 80 mole percent of imide moiety, represented by the formula

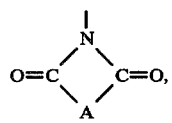

from about 0 to about 80 mole percent of amic acid moiety represented by the formula

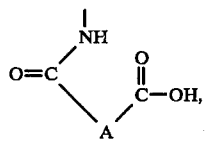

and from about 20 to about 95 mole percent of isocyanurate moiety represented by the formula

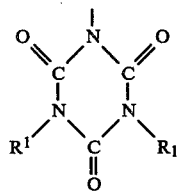

wherein A is a divalent organic radical containing an addition polymerizable ethylenic group and $R^1$ is a monovalent organic radical capable of bonding to an isocyanate group in an organic polyisocyanate.

6. The composition of claim 5 which contains from about 10 to about 70 mole percent of the imide moiety, from about 0 to about 40 mole percent of the amic acid moiety and from about 30 to about 70 mole percent of the isocyanate moiety.

7. The composition of claim 6 which is the reaction product of (1) a cyclic anhydride represented by the formula

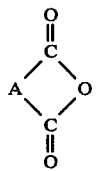

wherein A is a divalent organic radical containing an addition polymerizable, ethylenically unsaturated moiety and vicinal carbon atoms bonded to the carbonyl groups of the anhydride, (2) water and (3) an organic polyisocyanate represented by the formula $R^4(NCO)_x$ wherein $R^4$ is an x-valent organic radical having at least 4 carbon atoms and the "x" valence bonds are on different carbon atoms and x is a number from 2 to 6.

8. The composition of claim 7 wherein the anhydride is represented by the formula

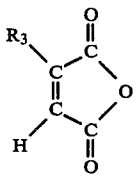

wherein $R^3$ is hydrogen or alkyl having 1 to 4 carbons and the polyisocyanate is a polyisocyanate containing an aromatic moiety.

9. The composition of claim 8 wherein the anhydride is maleic anhydride and the polyisocyanate is a polymeric methylene phenyl polyisocyanate.

10. A cross-linked resin formed by the addition polymerization of the composition of claim 5.

11. A cross-linked resin formed by the addition polymerization of the composition of claim 6.

12. A cross-linked resin formed by the addition polymerization of the composition of claim 7.

13. A cross-linked resin formed by the addition polymerization of the composition of claim 8.

14. The cross-linked resin of claim 10 in the form of a foam.

15. The cross-linked resin of claim 11 in the form of a foam.

16. The cross-linked resin of claim 12 in the form of a foam.

17. The cross-linked resin of claim 13 in the form of a foam.

* * * * *

UNITED STATES PATENT AND TRADEMARK OFFICE
CERTIFICATE OF CORRECTION

PATENT NO. : 4,454,257

DATED : June 12, 1984

INVENTOR(S) : Frederick J. Dechow and William G. Stobby

It is certified that error appears in the above—identified patent and that said Letters Patent is hereby corrected as shown below:

Title page under ABSTRACT additional paragraph should be added.

-- Alternatively, such cured resins which are useful as coating or foams may be formed by subjecting a curable mixture of an ethylenically unsaturated polyimide dispersed in an organic polyisocyanate to curing conditions. --

Col. 5, line 4, "tris-(4-isocyanthophenyl) should read -- tris-(4-isocyanatophenyl).

Col. 5, line 32, "of" should read -- or --.

Col. 7, line 6, "catalysts" should read -- catalysts, --.

Col. 13, line 16, "firesituation" should read -- fire situation --.

Signed and Sealed this

Eleventh Day of December 1984

[SEAL]

Attest:

GERALD J. MOSSINGHOFF

Attesting Officer

Commissioner of Patents and Trademarks